June 30, 1931. F. BOEDECKER 1,812,132
PRODUCTION OF VANILLIN AND I-VANILLIN
Filed Nov. 6, 1926
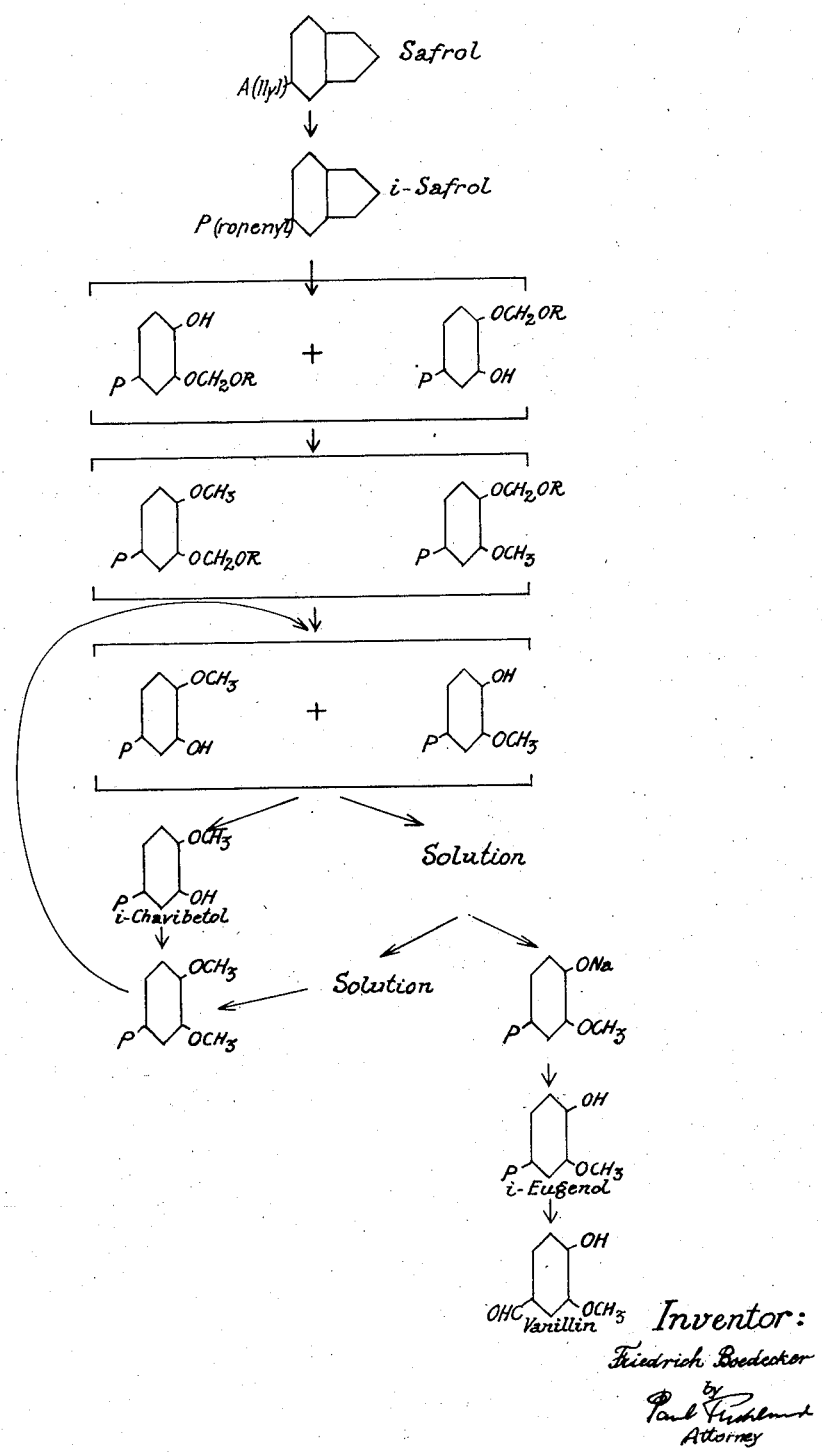
Inventor:
Friedrich Boedecker
by Paul Pushelm
Attorney Patented June 30, 1931

1,812,132

UNITED STATES PATENT OFFICE

FRIEDRICH BOEDECKER, OF BERLIN-DAHLEM, GERMANY, ASSIGNOR TO THE FIRM J. D. RIEDEL AKTIENGESELLSCHAFT, OF BERLIN-BRITZ, GERMANY

PRODUCTION OF VANILLIN AND I-VANILLIN

Application filed November 6, 1926, Serial No. 146,850, and in Germany November 10, 1925.

This invention relates to the production of vanillin and i-vanillin.

When heating safrol with alcoholic caustic alkali or an alcoholic solution of alkali alcoholate to temperatures of about 140–170° C., the methylene ether group is broken up and an adjunction of the alcohol employed takes place, the allyl radical being simultaneously transformed.

(1) $C_6H_3 \cdot C_3H_5O_2CH_2 + CH_3OH + KOH = C_6H_3 \cdot C_3H_5 \cdot OCH_2OCH_3OK + H_2O$ Safrol (i-Safrol)                                          Potassium salts of Propenyl-dihydroxybenzene-monomethoxymethyl ethers Hitherto it was believed that the above mentioned transformation of safrol to i-safrol and the simultaneous splitting of i-safrol only leads to propenyl- or thodihydroxybenzene-mono-alkoxy-methyl-ether, in which the hydroxyl group being in the meta-position to the propenyl radical carries the alkoxy-methyl radical. In fact, however, it has been ascertained that the reaction product forms a mixture containing the alkoxy-methyl radical as well in the meta- as in the para-position to the propenyl group. It is therefore possible to obtain from safrol, vanillin and i-vanillin, or even either product practically alone, in the following manner:—

When treating the product resulting from splitting safrol or i-safrol (after separating, if required, the unchanged starting material) with methylating means, as, f. i., dimethyl sulfate, and heating the resulting mixture of ethers, preferably in alcoholic solution, with a diluted acid, a mixture of i-eugenol and i-chavibetol is obtained. This may be oxidized in the well-known manner to the aldehydes and then the vanillin may be separted from the i-vanillin.

1000 grams of safrol are heated with 3 liters of a 25% methylalcoholic caustic potash solution for 20 hours in an autoclave provided with a stirrer to 130–140° C. Then the methyl alcohol is distilled off and the residue is dissolved in 4 liters of water. For removing the undecomposed safrol the aqueous solution is extracted by shaking it with benzene. After distilling off the benzene about 30 grams of i-safrol remain from the benzene solution.

To the aqueous alkaline solution, 700 grams of conc. hydrochloric acid are added to neutralize the excess of alkali, and then 800 grams of dimethyl sulfate are introduced under stirring, the temperature not exceeding 40° C. The methyl ether deposits in the form of an oil upon the reaction product; it may be separated by siphoning and washed with water.

(2) $C_6H_3 \cdot C_3H_5 \cdot OCH_2OCH_3OK + (CH_3)_2SO_4 = C_6H_3 \cdot \overset{1}{C_3H_5} \cdot \overset{3(4)}{OCH_2OCH_3} \cdot \overset{4(3)}{OCH_3}$ Dimethyl-      Propenyl-dihydroxybenzene
sulfate        methoxymethyl-methyl ethers When distilled in vacuo it goes over as a colorless oil at 160–163° C. and 13 millimeters. The output amounts to 900 grams. From the aqueous alkaline solution about 100 grams of the non-methylated product may be recovered by acidulating. 900 grams of the methyl ether are refluxed for 6 hours with 5.5 liters of alcohol, 2–6 liters of water and 4 cubic centimeters of hydrochloric acid. Then the alcohol is distilled off, the residue is dissolved in diluted caustic soda solution and the latter is extracted by shaking it with benzene for removing the non-saponified methyl ether. From the benzene solution about 20 grams of non-saponified methyl ether may again be recovered.

The alkaline solution is acidified and the precipitated phenols are collected by means of benzene, washed with water and dried.

After the benzene is distilled off, 650 grams of a product remain, consisting of a mixture of i-chavibetol and i-eugenol.

(3) $C_6H_3 \cdot C_3H_5 \cdot OCH_2OCH_3 \cdot OCH_3 + HCl =$

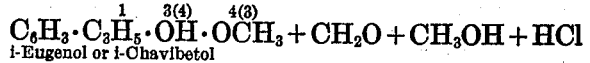

This mixture is oxidized in the usual manner and the resulting mixture of vanillin and i-vanillin is separated, for instance, by means of soda ash.

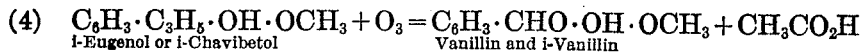

Now it is possible to treat this mixture of i-eugenol and i-chavibetol in such a manner that it is almost completely transformed to the more valuable i-eugenol or vanillin respectively. At first the i-chavibetol having the higher fusing point is separated by freezing-out and then it is transformed to propenyl veratrol by treating it with methylating means, as with dimethyl sulfate or methyl chloride or other halogenide &c. By heating the propenyl veratrol with alkali at temperatures preferably between 100 and 150° C. again a mixture of i-eugenol and i-chavibetol is produced. The main quantity of the i-chavibetol may be separated by freezing-out as above. By subjecting it again to the above described process together with the i-chavibetol first separated from the mixture resulting from the following batch, almost the whole of the i-chavibetol may be gradually transformed to i-eugenol.

Now the product contained in the filtrates after separation of the i-chavibetol can be treated so as to obtain pure i-eugenol.

It has been found that the alkali salts of i-eugenol are difficultly soluble in water, alcohol &c. contrary to those of i-chavibetol. It is therefore possible to separate, from a solution containing the above mentioned phenols besides, to all appearance, further isomers, after freezing-out the main quantity of the i-chavibetol, the i-eugenol in the form of an alkali metal salt. The i-eugenol separated therefrom by acidifying is obtained with a degree of pureness not yet described; whereas hitherto i-eugenol was only known to solidify in the cold, the product obtained according to the present invention shows a fusing point of 24° C.

208 grams of the mixture of i-chavibetol and i-eugenol obtained according to the above example are mixed with 130 grams of rexahydrotoluol. After standing in the cold for some hours the crystallized product is filtered off and washed with some hexahydrotoluol. 79 grams are obtained having a fusing point of 94° C. The mother liquor is freed from its solvent and on distilling in vacuo 120 grams of a product are obtained which at a pressure of 13 millimeters, boils at from 142 to 146° C.; it consists mainly of i-eugenol.

100 grams of this product are heated to about 70° C. with 230 cubic centimeters of 12% caustic soda solution. The sodium salt which crystallizes after cooling down is filtered off and washed with common salt solution. In this manner 80 grams of sodium i-eugenolate are obtained. By decomposing the same with diluted acid pure i-eugenol showing a fusing point of 24° C. is obtained.

The waste alkali metal salt solution from the separation of the i-eugenol yields on acidulating an oil corresponding to about 20% of the i-eugenol and i-chavibetol consumed. I have not succeeded in separating therefrom, even by means of the above described method, the two propenyl-dihydroxybenzene ethers, after freezing-out the remainders of i-chavibetol which might be present. However I have surprisingly attained the desired end by methylating the present mixture of phenols and splitting up the completely methylated reaction product with an alkali at a somewhat elevated temperature. From the mixture thus produced as well i-chavibetol as i-eugenol may be obtained. Again an oil is produced in a quantity amounting to 20% of the raw material uncapable of yielding a crystalline product. It may be treated in the above described manner, preferably in connection with a fresh batch, for recovering the two isomers. It is, however, not necessary to start from the oil itself, but when methylating with dimethyl sulfate, for instance, one may start directly from the liquor remaining from the separation of the sodium i-eugenolate.

After separating the i-chavibetol and the i-eugenol from 100 grams of a mixture containing both isomers according to the above example, a salt solution corresponding to about 20 grams of the starting material is left. To this solution 16 grams of dimethyl sulfate are added by drops. The temperature rises to about 35° C. the reaction product being deposited as an oil upon the aqueous solution. By distilling the separated end washed product propenyl dihydroxybenzene dimethyl ether in the form of a slightly yellow-colored oil is obtained, showing a fusing point of from 142 to 146° C. at a pressure of 13 millimeters.

90 grams of this dimethyl ether, 90 grams of caustic alkali, and 90 grams of alcohol are heated to 140° C. in an autoclave provided with a stirring device for about 20 hours. The alcohol is then distilled off, the residue is dissolved in water, and the aqueous solution is washed with ether for removing the dimethyl ether which might have escaped the splitting action. The solution is carefully acidulated and the separated oil is dissolved in ether. After distilling off the ether the residue distills in vacuo at from 145 to 152° C. under a pressure of 13 millimeters. The output amounts to about 80 grams. From the distillate i-chavibetol crystallizes out on cooling down. The mass is allowed to stand at about 0° C., and then the i-chavibetol the quantity of which amounts to about 25 grams, is filtered by suction. To the filtrate a 15% caustic soda solution is added, and after some standing the crystallized sodium i-eugenolate is filtered by suction. By suspending in water and acidfying free i-eugenol is obtained from the sodium salt, its quantity amounting to about 40 grams. The remainder of the product of the splitting reaction left in the mother liquor is precipitated by acidulating and is then returned into the process.

The whole of the i-chavibetol is now transformed, in the well-known manner, to i-eugenol methyl ether by boiling with a methyl halogenide in alcoholic solution. With theoretical output products boiling at 150—151° C. under a pressure of 14 millimeters are obtained.

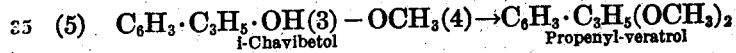

80 parts of i-eugenol methyl ether are now heated to 140° C. in an autoclave provided with a stirring device together with 80 parts of alcohol and 80 parts of powdered caustic potash for about 20 hours (aqueous or alcoholic caustic alkali may likewise be used for carrying out the reaction).

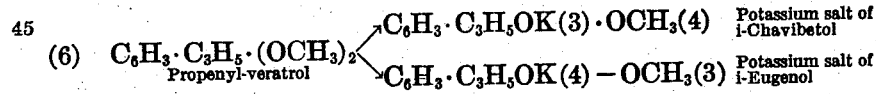

Hereupon the alcohol is distilled off, the residue is dissolved in water and the aqueous solution is extracted by shaking the same with benzene. Now the solution is acidulated, the precipitating oil is dissolved in benzene, washed with water and dried over $Na_2SO_4$. After distilling off the benzene a partially crystalline, partially oily substance remains which is separated by freezing-out and, if required, by adding benzene to pure i-chavibetol and a liquid part mainly consisting of i-eugenol. From the last-mentioned filtrate i-eugenol is obtained in the above described manner.

The propenyl-dihydroxybenzene-monomethyl ether obtained as described is transformed in the well-known manner, for instance, by oxidizing them with ozone, to vanillin respectively.

I claim:—

1. Process of producing vanillin, comprising treating 1-2-dihydroxybenzene methylene ether substituted in the 4-position by an univalent unbranched alkylene radical $C_3H_5$ at elevated temperatures with alcoholic alkali, methylating the reaction product beating the resulting mixture of methyl-alkoxymethyl ethers with an acid, removing from the resulting mixture of the propanyl-orthodihydroxybenzene-monomethyl ethers the i-chavibetol by freezing out, converting the remaining more soluble propenyl-orthodihydroxybenzene monoethers into their alkali metal salts, thereby removing from them the less soluble alkali metal salt of the i-eugenol, decomposing the said salt by an acid, and oxidizing the resulting i-eugenol to vanillin.

2. Process of producing vanillin, comprising treating 1-2-dihydroxybenzene methylene ether substituted in the 4-position by an univalent unbranched alkylene radical $C_3H_5$ at elevated temperatures with alcoholic alkali, methylating the reaction product heating the resulting mixture of methyl-alkoxymethyl ethers with an acid, removing from the resulting mixture of the propenyl-orthodihydroxybenzene-monomethyl ethers the i-chavibetol by freezing out, converting the remaining more soluble propenyl-orthodihydroxybenzene-monoethers into their alkali metal salts, thereby removing from them the less soluble alkali metal salt of the i-eugenol and decomposing the said salt by an acid, methylating the remaining mixture of propenyl-ortho-dihydroxybenzene-monomethyl-ethers, heating with alcoholic alkali, acidulating, again returning the remaining mixture into the process, and oxidizing the i-eugenol to vanillin.

3. Process of producing vanillin, comprising treating 1-2-dihydroxybenzene methylene ether substituted in the 4-position by an univalent unbranched alkylene radical $C_3H_5$ at elevated temperatures with alcoholic alkali, methylating the reaction product heating the resulting mixture of methyl-alkoxymethyl ethers with an acid, removing from the resulting mixture of the propenyl-orthodihydroxybenzene-monomethyl ethers the i-chavibetol by freezing out, converting the propenyl-orthodihydroxybenzene monoethers into their alkali metal salts, thereby removing from them the less soluble alkali metal salt of the i-eugenol, and decomposing the said salt by an acid, methylating the remaining mixture of propenyl-orthodihydroxy-benzene-monomethyl ethers and the said i-chavibetol, heating with alcoholic alkali, acidulating, again returning the remaining mixture into the process, and oxidizing the i-eugenol to vanillin.

4. A process for the purpose described, characterized by subjecting a mixture containing isoeugenol and isochavibetol to crystallization by means of cooling, whereby the isochavibetol is converted into crystalline form, and thereafter separating the liquid isoeugenol from the crystalline isochavibetol.

5. A process for the purpose described, characterized by subjecting a mixture of alkyloxy isoeugenol and alkyloxy isochavibetol to methylation and hydrolysis so as to obtain a mixture of isoeugenol and isochavibetol, subjecting the said resulting mixture to crystallization by means of cooling, whereby the isochavibetol is converted into crystalline form, and thereafter separating the isoeugenol from the isochavibetol.

6. A process for the purpose described, characterized by heating safrol with alcohol caustic potash to a temperature sufficient to produce alkoxy-methoxy-hydroxy-propenyl-benzenes, methylating the mixture of phenols so produced, hydrolyzing the methylated product, thereby obtaining a mixture of isoeugenol and isochavibetol, subjecting the said mixture to crystallization by means of cooling, whereby the isochavibetol is converted into crystalline form, and separating the isoeugenol as a liquid from the crystalline isochavibetol.

7. The steps in the process of making isomeric alkyl substituted phenol derivatives from safrol which consist in heating safrol with caustic alkali and a primary aliphatic alcohol to a temperature of between 140°–170° C., acidifying the reaction product to obtain said derivatives as two isomeric phenol ethers, and alkylating said phenol ethers.

8. The steps in the process of making isomeric alkyl substituted phenol derivatives from safrol which consist in heating safrol with caustic alkali and a primary aliphatic alcohol to a temperature of between 140° to 170° C., acidifying the reaction product to obtain said derivatives as two isomeric phenol ethers, and alkylating said phenol ethers with a dialkylsulphate.

9. The process of making isomeric alkyl substituted phenol derivatives from safrol which consists in heating safrol with caustic alkali and a primary aliphatic alcohol to a temperature of between 140° to 170° C., acidifying the reaction product to obtain said derivatives as two isomeric phenol ethers, and treating said isomeric phenol ethers to convert the hydroxy groups to alkoxy groups and the alkoxymethoxy groups to hydroxy groups.

10. The process of making isomeric alkyl substituted phenol derivatives from safrol which consists in heating safrol with caustic alkali and a primary aliphatic alcohol to a temperature of between 140° to 170° C.; acidifying the reaction product to obtain said derivatives as two isomeric phenol ethers, and treating said isomeric phenol ethers to convert in successive steps the hydroxy groups to alkoxy groups and the alkoxymethoxy groups to hydroxy groups.

11. As a new composition of matter, an equimolecular mixture of two isomeric phenol ethers having the formulæ 4-alkoxymethoxy-3-alkoxy-1-propenylbenzenes and 4-alkoxy-3-alkoxymethoxy-1-propenylbenzenes.

12. The process of obtaining a mixture of isoeugenol and its isomer isochavibetol from safrol which consists in heating safrol with caustic alkali and a primary aliphatic alcohol to a temperature of 140° to 170° C., acidifying the reaction product and treating the resulting mixture of isomeric phenol ethers so as to convert the hydroxy groups to methoxy groups and the alkoxymethoxy groups to hydroxy groups.

13. The process of obtaining a mixture of isoeugenol and its isomer isochavibetol from safrol, which consists in heating safrol with caustic alkali and a primary aliphatic alcohol to a temperature of 140° to 170° C., acidifying the reaction product and treating the resulting mixture of isomeric phenol ethers so as to convert in successive steps the hydroxy groups to methoxy groups and the alkoxymethoxy groups to hydroxy groups.

14. The process of obtaining a mixture of isoeugenol and its isomer isochavibetol from safrol, which consists in heating safrol with caustic alkali and a primary aliphatic alcohol to a temperature of 140° to 170° C., acidifying the reaction product, methylating the isomeric reaction product obtained and heating the resulting product with a weak acid solution.

15. The process of obtaining a mixture of isoeugenol and its isomer isochavibetol from safrol, which consists in heating safrol with caustic alkali and a primary aliphatic alcohol to a temperature of 140° to 170° C., acidifying the reaction product, methylating the isomeric reaction product obtained and heating the resulting product with a weak acid in alcoholic solution.

16. The process of obtaining a mixture of isoeugenol and its isomer isochavibetol from safrol, which consists in heating safrol with caustic alkali and a primary aliphatic alcohol to a temperature of 140° to 170° C., acidifying the reaction product, treating the isomeric reaction product obtained with dimethyl-sulphate in the presence of caustic alkali to convert the hydroxy groups into methoxy groups and then heating the resulting product with a weak acid solution to convert the alkoxymethoxy groups to hydroxy groups.

17. A new composition of matter consisting of a mixture of isoeugenol and isochavibetol in molecular proportion.

18. In the process of making isomeric alkyl substituted phenol derivatives from safrol, which consists in heating safrol with caustic alkali and a primary aliphatic alcohol to a temperature of between 140° to 170° C., acidifying the reaction product to obtain said derivatives as two isomeric phenol ethers, and alkylating said phenol ethers, the step which consists in heating the mixture of isomeric alkylated phenol ethers with a weak acid solution.

In testimony whereof I affix my signature.

FRIEDRICH BOEDECKER.